United States Patent [19]

Stadelmaier et al.

[11] E Patent Number: Re. 32,714

[45] Reissued Date of Patent: Jul. 19, 1988

[54] METHOD OF PRODUCING HIGH PERFORMANCE PERMANENT MAGNETS

[75] Inventors: Hans H. Stadelmaier; Nadia A. ElMasry, both of Raleigh, N.C.

[73] Assignee: North Carolina State University, Raleigh, N.C.

[21] Appl. No.: 854,125

[22] Filed: Apr. 21, 1986

Related U.S. Patent Documents

Reissue of:

[64] Patent No.: 4,541,877
Issued: Sep. 17, 1985
Appl. No.: 654,655
Filed: Sep. 25, 1984

[51] Int. Cl.[4] ..... H01F 1/02

[52] U.S. Cl. ..... 148/101; 148/104; 419/12; 419/45; 419/46

[58] Field of Search ..... 148/100, 101, 102, 103, 148/104, 105; 419/12, 29, 38, 45, 46

[56] References Cited

U.S. PATENT DOCUMENTS

| | | | |
|---|---|---|---|
| 3,821,035 | 6/1974 | Martin | 148/103 |
| 4,152,178 | 5/1979 | Malekzadeh et al. | 148/103 |
| 4,211,585 | 7/1980 | Inomata et al. | 148/103 |

FOREIGN PATENT DOCUMENTS

| | | | |
|---|---|---|---|
| 101552 | 2/1984 | European Pat. Off. | 148/302 |
| 54-136520 | 10/1979 | Japan | 148/104 |

OTHER PUBLICATIONS

Chabin et al., (Nd, Sm, Gd)-Fe-B Ternary Systems, Dopov. Akad. Nauk, URSR, Ser. A:Fiz-Mat. Tekh. Nauki, 1979(10), pp. 873-876.

*Primary Examiner*—John P. Sheehan
*Attorney, Agent, or Firm*—Bell, Seltzer, Park & Gibson

[57] ABSTRACT

A method of producing *permanent magnet material for* high performance permanent magnets is disclosed in which particles of a master alloy consisting of $Fe_2B$ having a maximum particle size of 50 microns is admixed with Fe powder and particles of a rare earth capable of combining with Fe and B to form a tetragonal compound of $Fe_{14}R_2B$ type. The admixture is compacted and a magnetic material is formed of the master alloy, Fe powder and [rate] *rare* earth particles which includes a major phase of at least one intermetallic compound of the Fe-R-B type having a crystal structure of the substantially tetragonal system and while the particle size of the crystal structure is controlled by sintering the compacted admixture at a temperature of about 700° C. to 1000° C. for from a fraction of an hour to 36 hours. The magnetic material is then annealed at a temperature of about 550° C. to 650° C. for a fraction of an hour to 2 hours.

10 Claims, No Drawings

METHOD OF PRODUCING HIGH PERFORMANCE PERMANENT MAGNETS

Matter enclosed in heavy brackets [ ] appears in the original patent but forms no part of this reissue specification; matter printed in italics indicates the additions made by reissue.

The present invention relates to permanent magnets and more particularly to a method of producing such magnets with high performance without the use of cobalt.

BACKGROUND OF THE INVENTION

There are a number of parameters that measure the performance of permanent magnets. The most important of these parameters are coercivity and energy product. Coercivity is the strength of an external field needed to demagnetize the permanent magnet and energy product is a composite of the strength of the magnet and its coercivity.

Until recently, permanent magnets formed of combinations of samarium and cobalt provided the highest parameters of coercivity and energy product. However, cobalt is a strategic material and the main source of cobalt in the United States is southern Africa, particularly Zaire, and political considerations frequently affect the availability and price of cobalt. Additionally, samarium—cobalt magnets are very expensive and their high price has limited their use for many applications.

Because of the foregoing there has been a search for an effective alternative to samarium—cobalt magnets which would provide high coercivity and energy product without the disadvantages of the samarium—cobalt magnets. Recently, such an effective substitute was proposed and this substitute utilizes a ternary compound of iron, boron and a light rare earth, such as neodymium.

Heretofore, magnets have been produced from the iron, boron and rare earth compound by conventional methods of producing magnets in which the ternary compound is melted and cast, the casting is crushed and milled to produce a powder of the desired small particle size, the particles of the powder are field oriented and compacted into the desired size and shape, the compacted powder is sintered at a temperature of at least 1000° C. for a sufficient time period—typically about one hour, and the sintered product is heat treated at about 630° C. for about one hour to enhance and in fact account for a large fraction of the magnetic characteristics of the product. While frequently producing acceptable magnets of the desired parameters, this method has numerous disadvantages and deficiencies.

Foremost among these disadvantages and deficiencies is the necessity that many of the steps of this method be carried out in an inert gas atmosphere, such as argon, because powders of the ternary compound are highly oxidative and cannot be processed in air. Additional disadvantages are non-reproducibility of the product, the complexity of the method, and powder handling problems caused by oxidation. Due to these many disadvantages and deficiencies, the prior method is expensive and results in a relatively high number of unacceptable magnets or rejects being produced.

With the foregoing in mind, it is an object of the present invention to provide a method of producing high performance permanent magnets from iron, boron and a rare earth which obviates the disadvantages and deficiencies of prior methods.

A more specific object of the present invention is to provide an inexpensive method of producing high performance permanent magnets using iron, boron and a rare earth which may be processed in air prior to sintering and which results in the production of a very low number of unacceptable magnets or rejects.

SUMMARY OF THE INVENTION

The foregoing objects are accomplished by the method of the present invention which includes the admixing of particles of a master alloy, consisting of $Fe_2B$, with Fe powder and particles of a rare earth, such as neodymium or praseodymium. The admixture is then compacted into the desired size and shape and an intermetallic compound of the master alloy, Fe powder and rare earth is formed by sintering, under strictly controlled atmosphere, time and temperature which permits control of the particle size of the resultant magnet to provide a very small particle size and concomitant high magnetic parameters. Finally, the magnet formed by the sintering of the compacted admixture is heat treated to enhance the magnetic characteristics thereof.

DETAILED DESCRIPTION OF THE PREFERRED EMBODIMENT

The method of the present invention includes the formation of particles of a master alloy which is stable and avoids the oxidation problems heretofore encountered in the production of sintered magnets using powders of the ternary compound itself. The master alloy we have chosen is $Fe_2B$ which is oxidation-resistant and can therefore be milled in air.

The master alloy ($Fe_2B$) powder is produced by melting of the master alloy and casting into ingots by conventional melting and casting techniques well-known to metallurgists. The cast ingots are then crushed by a jaw crusher to a particle size of about 1 mm and these particles are then milled by known milling techniques to a maximum particle size of 50 microns.

The method of the present invention also uses elemental iron powder (Fe) which is commercially available and relatively inexpensive. Additionally, such iron powder is stable and may be stored and handled in air. Similarly, the rare earth is employed in elemental form as available powder or is freshly ground from ingots into particles large enough to preclude rapid oxidation in air. The particle size of the elemental rare earth used in the method of the present invention is not critical whereas in prior methods the particle size of the ternary compound is extremely critical.

The rare earth may be any one of or a combination of the rare earths which react favorably with the iron and boron to produce a major phase of at least one intermetallic compound of the Fe-R-B type having a crystal structure of the substantially tetragonal system. Such rare earths include neodymium, praseodymium, gadolinium, samarium, cerium and possibly others.

The master alloy powder is admixed with the Fe powder and rare earth particles (typically filings) to produce an admixture in which, for example, the iron (Fe) comprises about 75 to 82 atomic %, the boron comprises about 6 to 10 atomic % and the rare earth comprises about 12 to 16 atomic %. This admixture is then compacted into the desired size and shape under a pressure of about 50,000 to 100,000 psi.

The green compacts composed of the compacted admixture of the master alloy powder, the Fe powder and the filings of the rare earth are then sintered in a vacuum of $10^{-4}$ Torr or an argon atmosphere at a temperature within the range of about 700° C. to about 1000° C. for a time period within the approximate range of a fraction of an hour to 36 hours. Sintering at this temperature and time causes the compacted powders and particles to react to form a magnetic material which includes a major phase of at least one intermetallic compound of the Fe-R-B type having a crystal structure of the tetragonal system. Our experiments using neodymium as the rare earth component have shown that one such intermetallic compound formed is $Fe_{14}Nd_2B$. Additionally, we have discovered that sintering temperature and time within these ranges permit the particle size of the $Fe_{14}Nd_2B$ crystallites to be controlled to produce the small particle size necessary to achieve high coercivity.

The magnetic material produced by the sintering of the green compacts has substantial magnetic properties without subsequent heat treatment or annealing. However, such heat treatment or annealing at a temperature of about 550° C. to about 650° C. for a sufficient time, such as about a fraction of 1 hour to about 2 hours will enhance these magnetic properties and produce a permanent magnet with high coercivity.

Magnetic material has been produced by admixing sufficient amounts of master alloy particles, Fe powder and Neodymium particles to provide a composition (in atomic %) of 77 Fe, 15 Nd, 8B, compacting this admixture under a pressure of 100,000 psi without the use of a binder or die lubricant, and sintering in a vacuum of $10^{-4}$ Torr for 4 hours at 800° C. The magnetic material was magnetized in a maximum field of 12 kOe and had $H_{ci}$ of 6 kOe. This material was then annealed for 1 hour at 600° C. and then had a $H_{ci}$ of 7.5 kOe.

Magnetic material has also been produced by the above procedure except compaction was under pressure of 50,000 psi, sintering was conducted in a vacuum of $10^{-4}$ Torr for 24 hours at 700° C. and annealing was performed for 2 hours at 600° C. This magnetic material had a coercivity ($H_{ci}$) [or] *of* 7 kOe.

In the specification, there has been set forth a preferred embodiment of the invention, and although specific terms are employed, they are used in a generic and descriptive sense and not for purposes of limitation.

That which is claimed is:

1. A method of producing *permanent magnet material for* high performance permanent magnets characterized by an absence of cobalt, said method comprising the steps of (a) admixing particles of a master alloy consisting of $Fe_2B$ with Fe powder and particles of a rare earth capable of combining with Fe and B to form a [tetraganol] *tetragonal* compound of $Fe_{14}R_2B$, (b) compacting the admixture into a predetermined size and shape, and (c) forming a magnetic material of the $Fe_2B$, Fe powder and rare earth which includes a major phase of at least one intermetallic compound consisting of Fe-R-B and having a [tetragoval] *tetragonal* crystal structure while controlling the particle size of the crystal structure and imparting magnetic characteristics thereto by sintering the compacted admixture at a temperature within the range of about 700° C. to about 1000° C. for a time period within the range of about a fraction of 1 hour to 36 hours [to produce a permanent magnet with high coercivity] *to produce magnetic material with high coercivity.*

2. A method according to claim 1 wherein the particles of master alloy are formed by melting and casting the master alloy, and crushing and milling the casting.

3. A method according to claim 1 including heat treating the magnetic material at a temperature of about 550° C. to 650° C. for a time sufficient to enhance the magnetic characteristics thereof.

4. A method according to claim 1 wherein the particles of the master alloy are of a size no larger than about 50 microns.

5. A method of producing *permanent magnet material for* high performance permanent magnets characterized by an absence of cobalt, said method comprising the steps of (a) forming milled particles of a master alloy consisting of $Fe_2B$ by melting and casting the master alloy and crushing and milling the cast master alloy to a particle size no larger than about 50 microns, (b) admixing the master alloy particles with Fe powder and particles of a rare earth capable of combining with the Fe and B to form a tetragonal compound of $Fe_{14}R_2B$, (c) compacting the admixture into a predetermined size and shape, (d) forming a magnetic material of the $Fe_2B$, Fe powder and rare earth which includes a major phase of at least one intermetallic compound consisting of Fe-R-B and having a [tetrogonal] *tetragonal* crystal structure while controlling the particle size of the crystal structure and imparting magnetic characteristics thereto by sintering the compacted admixture at a temperature within the range of about 700° C. to about 1000° C. for a time period within the range of about a fraction of 1 hour to 36 hours [to produce a permanent magnet with high coercivity] *to produce magnetic material with high coercivity*, and (e) heat treating the magnetic material at a temperature of about 550° to 650° C. for about a fraction of an hour to two hours to enhance the magnetic characteristics thereof.

6. A method according to claim 5 wherein the rare earth comprises neodynium.

7. A method according to claim 6 wherein the compacted admixture is sintered at a temperature within the range of about 800° C. to about 900° C. for a time period within the range of about 0.25 hours to 10/hours.

8. A method according to claim 5 wherein the admixture is compacted under a pressure of about 75,000 psi.

9. A method according to claim 5 wherein the rare earth comprises praseodymium.

10. A method according to claim 5 wherein the rare earth comprises a mixture of neodymium and praseodymium.

* * * * *

UNITED STATES PATENT AND TRADEMARK OFFICE

CERTIFICATE OF CORRECTION

PATENT NO. : RE 32,714

DATED : July 19, 1988

INVENTOR(S) : Hans H. Stadelmaier & Nadia A. ElMasry

It is certified that error appears in the above-identified patent and that said Letters Patent is hereby corrected as shown below:

As the first paragraph of the specification, please add -- This invention was made with Government support under Contract N00014-81-K-0753 awarded by the Department of the Navy. The Government has certain rights in the invention. --

Signed and Sealed this

Fourteenth Day of November, 1989

*Attest:*

JEFFREY M. SAMUELS

*Attesting Officer* *Acting Commissioner of Patents and Trademarks*